Nov. 17, 1959 P. L. STAVENGER ET AL 2,913,112
HYDROCYCLONE CONTROL
Filed Nov. 26, 1956
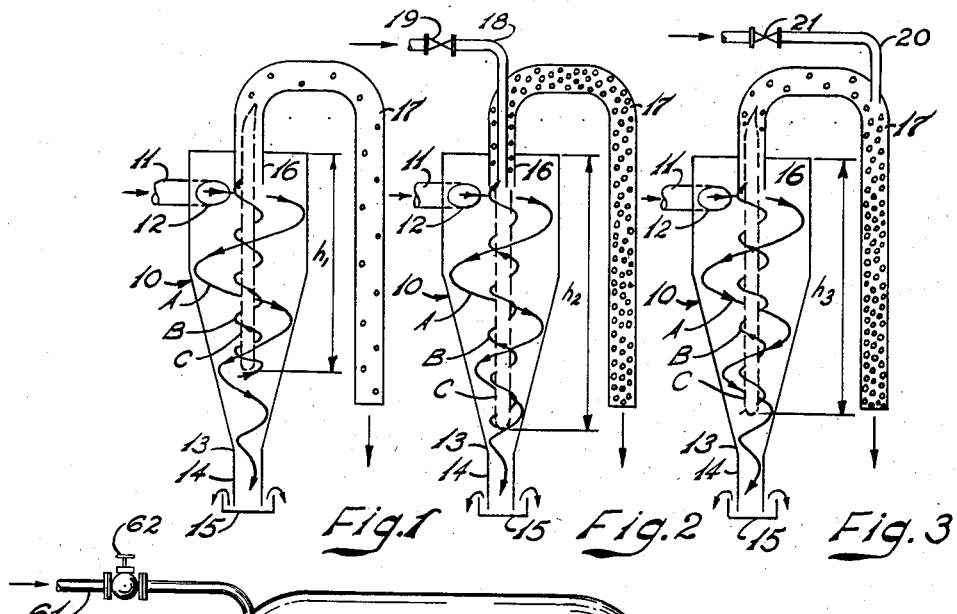
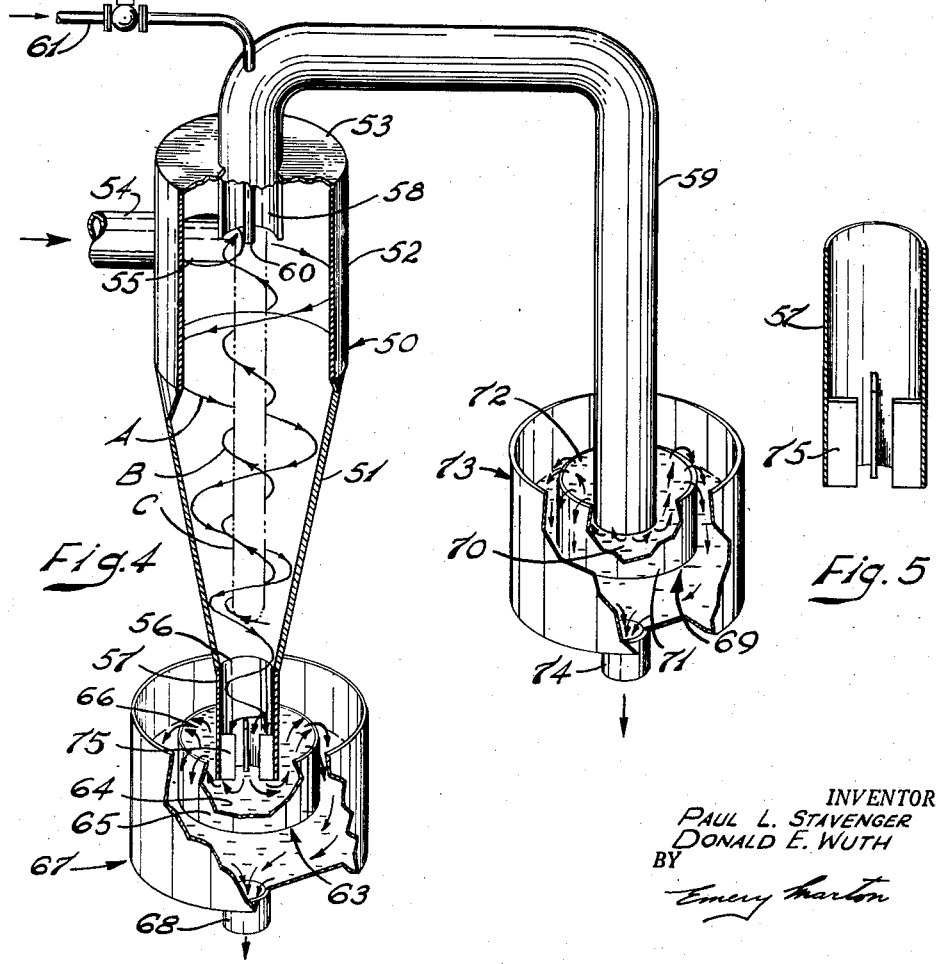
INVENTORS
PAUL L. STAVENGER
DONALD E. WUTH
BY United States Patent Office 2,913,112
Patented Nov. 17, 1959

2,913,112

HYDROCYCLONE CONTROL

Paul L. Stavenger, Westport, and Donald E. Wuth, Old Greenwich, Conn., assignors to Dorr-Oliver Incorporated, Stamford, Conn., a corporation of Delaware Application November 26, 1956, Serial No. 624,374

4 Claims. (Cl. 209—211)

This invention relates to a method and means for the treatment of liquid suspensions by centrifugal separation. More particularly, it relates to the controlled introduction of gaseous fluid into an operating hydrocyclone system for the purpose of controlling the density of the underflow.

A hydrocyclone, as that term is used in the art, generally comprises a hollow body, the inner surface of which is, most frequently, in the form of a truncated cone, the base end of said cone being, in some cases, cylindrically extended for a distance. Means are provided in the region of the base of the cone for introducing material to be treated and for imparting a tangential velocity thereto. At least two discharge means are generally provided for the hollow body, one being axially disposed in the influent or base region of the unit, and the other being axially disposed in the region of the apex. During operation material to be treated is continuously fed to the unit and caused to rotate rapidly about the central axis. Material which, by reason of shape, greater size, or higher specific gravity, has a higher "settling rate" will, in accordance with well known physical laws, tend to migrate toward the wall of the unit, while material having a lower "settling rate" tends to accumulate in the central region. Having thus achieved a separation of material of high settling rate from that of low settling rate, the separate withdrawal of these materials is effected by providing withdrawal means in functional relationship with each of said components. The axially disposed base end discharge means, being, of course, farthest removed from the wall, provides egress means for the low settling rate material, while the apex discharge means, which may be regarded as being formed by the truncated terminus of the conical wall itself, provides egress means for the high settling rate material.

It should perhaps be interposed at this point that the foregoing description of a hydrocyclone and its method of operation is very much simplified and generalized. Its purpose is, however, merely the delineation of the environment of this invention—it being recognized that treatment within a hydrocyclone actually involves an exceedingly intricate series of hydraulic interrelationships.

The flow pattern existing within an operating hydrocyclone may be described as comprising an outer helix through which the high settling rate materials and some liquid (referred to in the art as the underflow) progress from the base or influent end of the unit toward and into the apex discharge means, and a second inner helix through which the lower settling rate materials and the remainder of the liquid (referred to in the art as the overflow) progress in the opposite direction, or namely to the base discharge means. This second helix, which, incidentally, has the same rotational direction as the outer helix, generally extends as an identifiable stream along the axis of the unit from the overflow discharge means to a plane somewhat short of the underflow discharge means.

In normal operation, the radial pressure distribution within a hydrocyclone will vary from a maximum at or near the marginal wall, to a minimum at or near the axis. When either the apex or the base discharge opening of a hydrocyclone is open to atmosphere, the axial pressure, will, of course, be minimally limited to atmospheric pressure; any tendency toward further pressure reduction resulting only in the formation of an air core under substantial atmospheric pressure along the axis. This, as a matter of fact, is the condition most frequently encountered. If, on the other hand, the apex discharge opening and the base discharge opening are isolated from the atmosphere, the axial pressures can fall well below atmospheric. Under these circumstances, even if a gas core composed primarily of gases which happen to be present in the suspension to be treated does form, the pressure within such gaseous core will still be of a relatively low order of magnitude. Carrying this analysis one step further, if a certain external pressure is imposed on the apex and base openings, and if secondary factors which effect pressure such as viscosity, shear etc. be disregarded, the pressure along the axis of the hydrocyclone will be minimally limited to the imposed pressure. Thus, for example, in a case where the apex discharges freely into a chamber maintained at say ten p.s.i. the axial pressure will be more or less minimally limited to that figure.

Among the factors which influence the degree and nature of separation attained in a hydrocyclone is the ratio of overflow volume to underflow volume. This being the case, and all other factors being constant, the functional operation of a hydrocyclone can be more or less positively controlled by means which are capable of controllably determining one or both of said volumes and correspondingly altering the aforementioned ratio. It has been suggested that one such means would involve provision for the control of the static pressures existing downstream of the apex opening and/or the base opening of the unit. Manifestly, raising the pressure in the downstream side of one opening would cause proportionally more material to pass out the other opening and vice versa. Since the underflow density is a direct function of the overflow-underflow ratio, said density can be raised by either increasing the external pressure on the underflow or decreasing it on the overflow; the converse also being true.

One of the schemes known to the art for achieving this purpose involves the utilization of so-called "discharge legs" which generally take the form of downwardly extending conduits attached to the underflow and overflow discharge of the hydrocyclone, each of said conduits terminating in a liquid seal reservoir or "saucer." The basic operating principle involved is the utilizaton of the column of materal present in each leg during operation to establish and maintain a certain desired pressure at the respective discharge opening. The liquid seal reservoir is provided, not only for the purpose of assuring that the leg will always flow full, (the liquid level in said saucer always being kept above that of the end of the discharge conduit) but, in addition, to provide means for varying the effective length of the leg. For this reason additional means must be provided for raising and lowering the liquid seal reservoirs. Lowering the reservoirs lowers the liquid level therein with respect to the hydrocyclone and correspondingly increases the effective length of the related leg. This, in turn, reduces the pressure on the downstream side of the discharge opening involved, and brings about the overflow-underflow ratio changes hereinabove discussed.

In practice, it has been found that the mechanical means provided to adjust the elevation of the liquid seal reservoirs provide serious maintenance problems due to corrosive and abrasive conditions encountered at some installations. A tendency to clog with solids has also been experienced. In addition, the elevational range over which they can be adjusted is quite limited.

It is the principal object of this invention to provide a method and means for controlling underflow density without having to resort to adjustable liquid seal reservoirs.

More particularly, it is an object of this invention to provide a method and means for altering the overflow-underflow ratio by altering the static head acting to draw material through the discharge openings of a hydrocyclone.

These and other objects are attained, according to the teachings of this invention, by controllably bleeding a gaseous fluid into the liquid material being treated.

As this invention may be embodied in several forms without departing from the spirit or essential characteristics thereof, the present embodiment is therefore illustrative and not restrictive, since the scope of the invention is defined by the appended claims rather than by the preceding description, and all changes that fall within the metes and bounds of the claims, or equivalents of such metes and bounds, are therefore intended to be embraced by the claims.

Figure 1 is a schematic cross-sectional elevation of apparatus to which this invention may be applied.

Figures 2 and 3 are schematic cross-sectional elevations of apparatus embodying the teachings of this invention.

Figure 4 is a cutaway view of a preferred apparatus embodiment of this invention.

Figure 5 is a cutaway view of detail of the Figure 4 embodiment.

Figure 1 illustrates a conventional, generally conical hydrocyclone 10 fitted with conventional discharge legs 14 and 17. An inlet conduit 11 is disposed at the base end of said hydrocyclone and is tangentially joined thereto as shown at 12. The apex 13 of the hydrocyclone chamber is fitted with a coaxial discharge leg 14 discharging into liquid seal means 15 which, in this embodiment is shown as an open-top container, the peripheral wall of which extends to an elevation above that of the downstream terminus of the apex discharge leg. Base discharge means 16, generally referred to in the art as a vortex finder, is axially disposed at the base end of hydrocyclone 10, and communicates with downwardly extending base discharge leg 17.

The apparatus of Figure 1 will generally function as follows. Suspension to be treated, approaching hydrocyclone 10 by way of conduit 11, passes through the opening 12 in a direction tangential to the inner wall of said hydrocyclone, and commences to move helically and generally downwardly. The more readily settleable material will, due to the effect of centrifugal forces, tend to move to the region adjacent the wall of the hydrocyclone, where they enter an outer helical stream A which eventually carries them to discharge through the apex opening 13 along with some of the carrier liquid. Less readily settleable material will tend to migrate toward an inner helical stream B, and will pass therewith to discharge through the base opening, or vortex finder, 16.

Two vortically moving streams are thus present within the unit—the outer generally apex directed stream A, and the inner generally base directed stream B, both having the same rotational direction. Under most operative conditions however, a third element is also present, this element being a central gas core C. If the apex discharge does not flow full, this gas core will comprise a column of air having a general upward movement due to the aspirating effect of the material passing through the base discharge means. If, however, the apex discharge means is caused to flow full the gas core C is composed of gases originating from any or all of the following; gases entrained in the influent material; gases drawn from solution by reason of the low pressures prevailing in the axial portion of the unit, and portions of the hydrocyclone liquid contents vaporized by said low pressures. Once established the size of such gas core is more or less stable, the quantity of gas aspirated out through the base discharge means 16 being equal to the gas entering the core from the hydrocyclone contents. Aspirated gases pass from said discharge means 16 to leg 17 in the form of discontinuous bubbles, and are carried out of the system with the base discharge fraction (overflow).

Figure 2 illustrates, schematically, one preferred embodiment of this invention. All structural elements are, except for the provision of air bleed means, identical with those of the Figure 1 apparatus, and need not again be described. In this embodiment, however, a conduit 18, is axially disposed within the unit, and is adapted, by means of associated valve 19, to controllably admit air (or other gaseous fluid if extraneous factors so dictate) into the axial region of the hydrocyclone. The effect of this introduction is two-fold. First, it tends to increase the axial pressure within the unit. For purposes of this invention however, it produces the sought-for results by greatly increasing the number of discontinuous phase bubbles present in the overflow and, consequently, in the overflow leg 17. The apparent specific gravity of the liquid column within said leg is thereby reduced, and the static head exerted by said column correspondingly diminished. By suitably controlling valve 19 the amount of air permitted to enter the system may be varied; this variation altering the head on the base discharge means 16 of the hydrocyclone, and thus providing effective means for controlling the proportion of the influent which reports to said base discharge means. Since, as hereinabove described, the underflow density is a function of the overflow-underflow ratio, effective control of said density is achieved.

Figure 3 schematically illustrates another embodiment of this invention. All structural elements are identical with those of the Figure 2 embodiment and need not again be described. This embodiment departs from that shown in Figure 2 solely in the disposition of air bleed means. In this embodiment air bleed conduit 20, with associated control valve 21, is so disposed that it will discharge into overflow leg 17 itself. The reduction of the apparent specific gravity of the material within said leg will exert its underflow density controlling effect in a manner identical to that of the Figure 2 embodiment. It is contemplated that the Figure 3 embodiment may be used in cases where the proportions and/or configuration of the hydrocyclone is such that undue turbulence is caused by the presence of air bleed means disposed as in the Figure 2 embodiment.

Before leaving the embodiment of Figures 1, 2 and 3, two secondary matters bear comment. Dimensions $h_1$, $h_2$ and $h_3$ are present to illustrate the fact that the proportions of the central gas core will be effected somewhat by the bleeding in of air, and by the manner of bleeding. The proportions shown are only for purposes of comparison and do not necessarily conform to actual conditions. Nevertheless, $h_1$ being less than either $h_2$ or $h_3$ and $h_2$ being greater than $h_3$, they do show that the bleeding in of air anywhere will increase the length of the core in the direction of the apex, and that the lengthening will be somewhat greater in the case in which the air is bled into the hydrocyclone than in the case in which it is bled into the overflow leg as hereinafter discussed. This latter difference may be of significance in installations in which the hydrocyclone is vertically disposed.

The second matter is that while single cyclones are shown in these embodiments and that of Figure 4, it is apparent that the same control principles apply with equal force in cases where a plurality of hydrocyclones are operated in parallel with manifolded underflows and/or overflows.

Figure 4 illustrates a practical, operable hydrocyclone incorporating the features of this invention. A hydrocyclone shown generally at 50 comprises a generally conical shell 51 which is coaxially joined, at its base end, to one end of a generally cylindrical section 52, the other end of which is fitted with closure plate 53. An inlet conduit 54 is tangentially joined to said cylindrical section, the line of intersection of said conduit and said cylinder being marked by opening 55. The opening 56 at the truncated apex of said conical section comprises the underflow discharge means. A second cylindrical member 57, coaxially attached to said conical section and extending downwardly from the apex opening thereof, comprises an underflow leg.

An axially disposed vortex finder or overflow discharge means 58 extends through said closure plate 53 and inwardly therefrom for a distance in the direction of the hydrocyclone apex. Overflow leg 59 is attached to said vortex finder 58 and extends therefrom to a lower elevation. Air bleed conduit 60 is axially disposed within said hydrocyclone at the base end thereof, and passing through said overflow leg 59 joins air supply line 61 with associated control valve 62. Although the drawing indicates that this valve is manually operated, an automatic control valve may, of course, be utilized.

A liquid sealing means shown generally at 63 is associated wtih the underflow leg 57, and comprises a vessel with bottom 64 and cylindrical wall 65. The upper edge 66 of said wall 65 is disposed at an elevation above that of the downstream terminus of underflow leg 57, the liquid sealing means being thereby adapted to retain a pool of underflow material and, thus, to facilitate the maintenance of a solid, coreless stream of underflow material in leg 57. A splash-guard, shown generally at 67, laterally surrounds said liquid sealing means 63, and serves to collect underflow passing over edge 66 and to carry it from the system by way of conduit 68.

Similarly a liquid sealing means shown generally at 69 is associated with the overflow leg 59, and comprises a vessel with bottom 70 and cylindrical wall 71. The upper edge 72 of said wall 71 is at an elevation above that of the downstream terminus of overflow leg 59, the liquid sealing means being thereby adapted to retain a pool of overflow material, and, thus, to facilitate the maintenance of a solid, coreless stream of overflow material in leg 59. A splash-guard, shown generally at 73, laterally surrounds said liquid sealing means 69, and serves to collect overflow passing over the edge 72 and to carry it from the system by way of conduit 74.

As indicated hereinabove, it is imperative for the purposes of this invention, that the underflow and overflow legs flow full—in other words that there be no direct gaseous communication by way of said legs between the central core within the hydrocyclone and the external gaseous environment, usually atmospheric. Due to various factors including the relatively large volume of the overflow fraction, the overflow leg generally does not present a problem in this regard. It has been found, however, that the underflow leg does present such a problem, and that, under certain conditions, even the liquid sealing means is insufficient to assure full flow in the leg—there being, under these conditions, a marked tendency for said seal to break, with a resulting admission of air into the core via the leg. Baffles 75 shown in Figures 4 and 5 have been provided in order to minimize and substantially eliminate this problem. These baffles, longitudinally and radially disposed in the lower portion of underflow leg 57 act to create a zone of sufficient turbulence to disrupt any continuous gas core which might otherwise tend to be formed. The baffle arrangement used, as shown in detail in Figure 5, comprises a plurality of radial baffles 75 disposed within leg 57 and fixedly attached to the inner surface thereof. In the preferred embodiment, they extend inwardly toward but, not to, the central axis of the leg.

The apparatus of Figure 4 functions as follows. Influent suspension, entering hydrocyclone 50 tangentially by way of conduit 54 and opening 55, commences to rotate rapidly about the longitudinal axis of the unit.

With continuous discharge of an underflow-fraction through apex opening 56 and the vortex finder 58, two distinct flow streams having the same rotational direction are formed within the unit; an outer helical stream A commencing in the region of the influent and extending to the apex opening 56, and an inner helical stream B commencing generally in the region of the apex and extending to the vortex finder. Under the influence of centrifugal forces, the higher settling rate materials present in the influent migrate toward and into said outer stream A for eventual discharge, together with some carrier liquid through apex discharge opening 56 while materials having a lower settling rate migrate toward and into the inner stream B for eventual discharge, together with the remainder of the carrier liquid, through vortex finder 58. Underflow material, having passed to and through apex discharge opening 56 enters discharge leg 57 containing baffles 75; said baffles acting, cooperatively with liquid sealing means 63, to facilitate the maintenance of full flow in said leg at all times during operation. Emerging from the downstream terminus of said leg 57, the underflow enters the pool contained in said liquid sealing means 63 and, progressing upwardly, flows over the edge 66 of wall 65. Conduit 68 in the bottom of splash guard 67 serves to remove the underflow fraction from the system.

Overflow material, having passed to and through vortex finder 58 enters discharge leg 59. Emerging from the downstream terminus of said leg, the overflow enters the pool contained in liquid sealing means 69, and, progressing upwardly, flows over the edge 72 of wall 71. Conduit 74 in the bottom of splash guard 73 serves to remove the overflow fraction from the system.

As is usually the case with apparatus of this description, a gaseous core C is present during operation. Gaseous material, generally originating as entrained or dissolved gases in the feed continuously enters this core, and, in the absence of other sources of gaseous material, an equal quantity is aspirated out by the overflow. In the Figure 4 embodiment however, an auxiliary source of gaseous material, comprising bleed conduit 60, air feed conduit 61 and control valve 62, are provided, and air is, during operation of the apparatus, bled in at a rate calculated to establish and maintain the underflow density at a desired level.

More particularly the operation of the air bleed feature is as follows. Assuming that for some reason, it becomes desirable to decrease the density of the underflow, air is introduced into the unit by opening valve 62 and permitting the low pressures prevailing in the axial region of the hydrocyclone to draw air through conduits 60 and 61. This air, together with gaseous matter drawn from the influent suspension, is drawn, by the action of the hydrocyclone itself, into vortex finder 58, and passes thence, in the form of finely divided bubbles, into overflow leg 59. The direct effect of the presence of these bubbles will be a reduction in the apparent specific gravity of the liquid column within said leg and, consequently, a reduction in the negative head produced by said column on the vortex finder 58. In other words, assuming a leg which extends to an elevation say two feet below the downstream end of the vortex finder, a solid column of water within such leg will exert a static pressure head of approximately .866 p.s.i. If half the water in the leg were replaced by discreet air bubbles, the static pressure exerted by the column on the downstream end of the vortex finder would be reduced by half and would equal only .433 p.s.i. The effect of this alteration in the pressure balance of the hydrocyclone would cause less material to pass out the overflow and produce a corresponding increase in underflow volume, the net effect being the desired decrease in underflow density.

It should also be noted at this point, that, under certain operating conditions, material benefits may be derived by placing hydrocyclone 50 on a horizontal axis. Underflow leg 57 and overflow leg 59 would still have to extend to elevations below those of their respective hydrocyclone discharge openings, but the conflicting effect resulting from the extension of the core toward the apex when air is bled in, as illustrated by dimensions $h_1$, $h_2$ and $h_3$ in Figures 1, 2 and 3 respectively would be eliminated. Thus, the extension of the core will not, as in the case of a vertical installation tend to reduce the static head of the column above the apex discharge opening 56 and thereby to counteract, in part, the tendency of the air introduction to increase the flow through said opening.

We claim:

1. A method for the treatment of liquid suspensions which comprises the steps of establishing and maintaining a vortically rotating, generally conical body of said suspension having a gas core therein, continuously and tangentially feeding suspension to be treated to said rotating body, continuously withdrawing an overflow fraction from the base end of said body, continuously withdrawing an underflow fraction from the apex end of said body, conveying each of said fractions, as a confined stream, to a level below the level at which it was withdrawn from said body, and bleeding a controlled quantity of air into the said gas core.

2. Apparatus for the treatment of a liquid suspension comprising a centrifugal separation chamber and means to establish a vortex of said suspension therein including a tangential feed inlet conduit for continuously introducing said suspension to said vortex, overflow and underflow discharge conduits connected to said chamber and operably associated with said vortex, and conduit means concentric within said overflow conduit for controllably introducing a gaseous fluid into the gas core of said vortex to control the density of the material discharging from said underflow.

3. Method for the treatment of liquid suspensions which comprises the steps of establishing and maintaining a vortically rotating body of said suspension having a gas core therein, continuously and tangentially feeding suspension to be treated to said body, continuously withdrawing overflow and underflow fractions from said body, and continuously introducing a gaseous fluid into the gas core of said body.

4. The method according to claim 3 with the additional steps of establishing and maintaining a separate body of underflow material, establishing and maintaining a separate body of overflow material, submergedly discharging said confined underflow fraction stream into said separate body of underflow material, and submergedly discharging said confined overflow fraction stream into separate body of overflow material.

References Cited in the file of this patent

UNITED STATES PATENTS

| 2,301,371 | Corwin | Nov. 10, 1942 |
| 2,648,433 | Wright | Aug. 11, 1953 |
| 2,781,907 | Fontein | Feb. 19, 1957 |
| 2,806,599 | Patrick | Sept. 17, 1957 |
| 2,829,771 | Dahlstrom | Apr. 8, 1958 |

FOREIGN PATENTS

| 974,413 | France | Sept. 27, 1950 |